(12) United States Patent
Umemoto et al.

(10) Patent No.: US 7,866,426 B2
(45) Date of Patent: Jan. 11, 2011

(54) RADIATOR SUPPORT STRUCTURE

(75) Inventors: Hideya Umemoto, Sakai (JP); Akira Minoura, Osaka (JP); Osami Fujiwara, Kishiwada (JP); Kazuaki Nogami, Sakai (JP); Takeshi Komorida, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/515,408

(22) Filed: Sep. 1, 2006

(65) Prior Publication Data

US 2007/0169455 A1  Jul. 26, 2007

(30) Foreign Application Priority Data

Jan. 26, 2006  (JP)  ............... 2006-018101

(51) Int. Cl.
   *B60K 11/04*  (2006.01)
(52) U.S. Cl. .................... 180/68.4; 56/14.7
(58) Field of Classification Search .......... 56/1, 56/10.1, 14.7, 16.7, 320.1, 323, DIG. 10; 277/921; 180/68.4, 68.6
   See application file for complete search history.

(56) References Cited

U.S. PATENT DOCUMENTS

| | | | | |
|---|---|---|---|---|
| 5,016,722 A | * | 5/1991 | Morita et al. ............ | 180/89.14 |
| 5,199,521 A | * | 4/1993 | Samejima et al. .......... | 180/68.1 |
| 5,209,314 A | * | 5/1993 | Nishiyama ................. | 180/68.6 |
| 6,089,343 A | * | 7/2000 | Brewer ...................... | 180/311 |
| 6,105,349 A | * | 8/2000 | Busboom et al. ............. | 56/14.7 |
| 6,520,563 B2 | * | 2/2003 | Nozaki ..................... | 296/146.9 |
| 6,634,448 B2 | * | 10/2003 | Bland ....................... | 180/68.1 |
| 6,823,955 B2 | * | 11/2004 | Hall et al. ................. | 180/68.1 |
| 6,854,252 B2 | * | 2/2005 | Foster ...................... | 56/320.1 |
| 6,997,280 B2 | * | 2/2006 | Minoura et al. ............. | 180/291 |

FOREIGN PATENT DOCUMENTS

| | | |
|---|---|---|
| JP | 64001068 U1 | 1/1989 |
| JP | 01211420 A | 8/1989 |
| JP | 4118815 U1 | 10/1992 |
| JP | 455033 Y | 12/1992 |
| JP | 10-331657 | 12/1998 |
| JP | 2002-068030 A | 3/2002 |
| JP | 2003-154857 | 5/2003 |
| JP | 2003-304722 A | 10/2003 |
| JP | 2004-237953 | 8/2004 |

\* cited by examiner

*Primary Examiner*—Thomas B Will
*Assistant Examiner*—Mai T Nguyen
(74) *Attorney, Agent, or Firm*—The Webb Law Firm

(57) ABSTRACT

A riding type mower comprises: a plurality of wheels; a vehicle body supported by the plurality of wheels; a water-cooled engine located in a rear region of the vehicle body; a hood for covering the engine; a driver's seat located forwardly of the hood; a rollover protection frame located between the driver's seat and the water-cooled engine, the rollover protection frame having a pair of right and left support columns spaced apart from each other in a lateral direction; a radiator for the water-cooled engine located between the pair of the support columns of the rollover protection frame.

11 Claims, 11 Drawing Sheets

(A)

(B)

RADIATOR SUPPORT STRUCTURE

BACKGROUND OF THE INVENTION

This invention relates to a riding type mower having a rollover protection frame.

A known riding type mower of the type noted above includes a motor section disposed at the rear of a vehicle body having front wheels and rear wheels, a driver's seat mounted forwardly of the motor section, and an arch-shaped rollover protection frame erected rearwardly of the driver's seat (see Japanese Unexamined Patent Publication No. 2004-237953, for example).

In the above conventional riding type mower, an air-cooled gasoline engine is mounted in the motor section to make the motor section short in the fore and aft direction, thereby to make the vehicle body compact over the entire length thereof. However, a high-power water-cooled engine is desired in order to improve running capability and grass cutting capability.

With the water-cooled engine, generally, a radiator cooled by a cooling fan driven by engine power is disposed in front of the engine. Consequently, the motor section accommodating the radiator and engine tends to be long in the fore and aft direction, thereby impairing compactness over the entire length of the vehicle body.

A riding type mower in accordance with the present invention comprises: a plurality of wheels; a vehicle body supported by the plurality of wheels; a water-cooled engine located in a rear region of the vehicle body; a hood for covering the engine; a driver's seat located forwardly of the hood; a rollover protection frame located between the driver's seat and the water-cooled engine, the rollover protection frame having a pair of right and left support columns spaced apart from each other in a lateral direction; a radiator for the water-cooled engine located between the pair of the support columns of the rollover protection frame.

Since the radiator is located between the support columns of the rollover protection frame, the space between the support columns can be utilized efficiently.

SUMMARY OF THE INVENTION

This invention has been made having regard to the state of the art noted above, and its primary object is to provide a riding type mower of high capabilities that can carry a water-cooled engine and that makes efficient use of its space.

A riding type mower comprises: a plurality of wheels; a vehicle body supported by the plurality of wheels; a water-cooled engine located in a rear region of the vehicle body; a hood for covering the engine; a driver's seat located forwardly of the hood; a rollover protection frame located between the driver's seat and the water-cooled engine, the rollover protection frame having a pair of right and left support columns spaced apart from each other in a lateral direction; a radiator for the water-cooled engine located between the pair of the support columns of the rollover protection frame.

Since the radiator is located between the support columns of the rollover protection frame, the space between the columns are utilized efficiently.

DETAILED DESCRIPTION OF PREFERRED EMBODIMENTS

Figure 1:
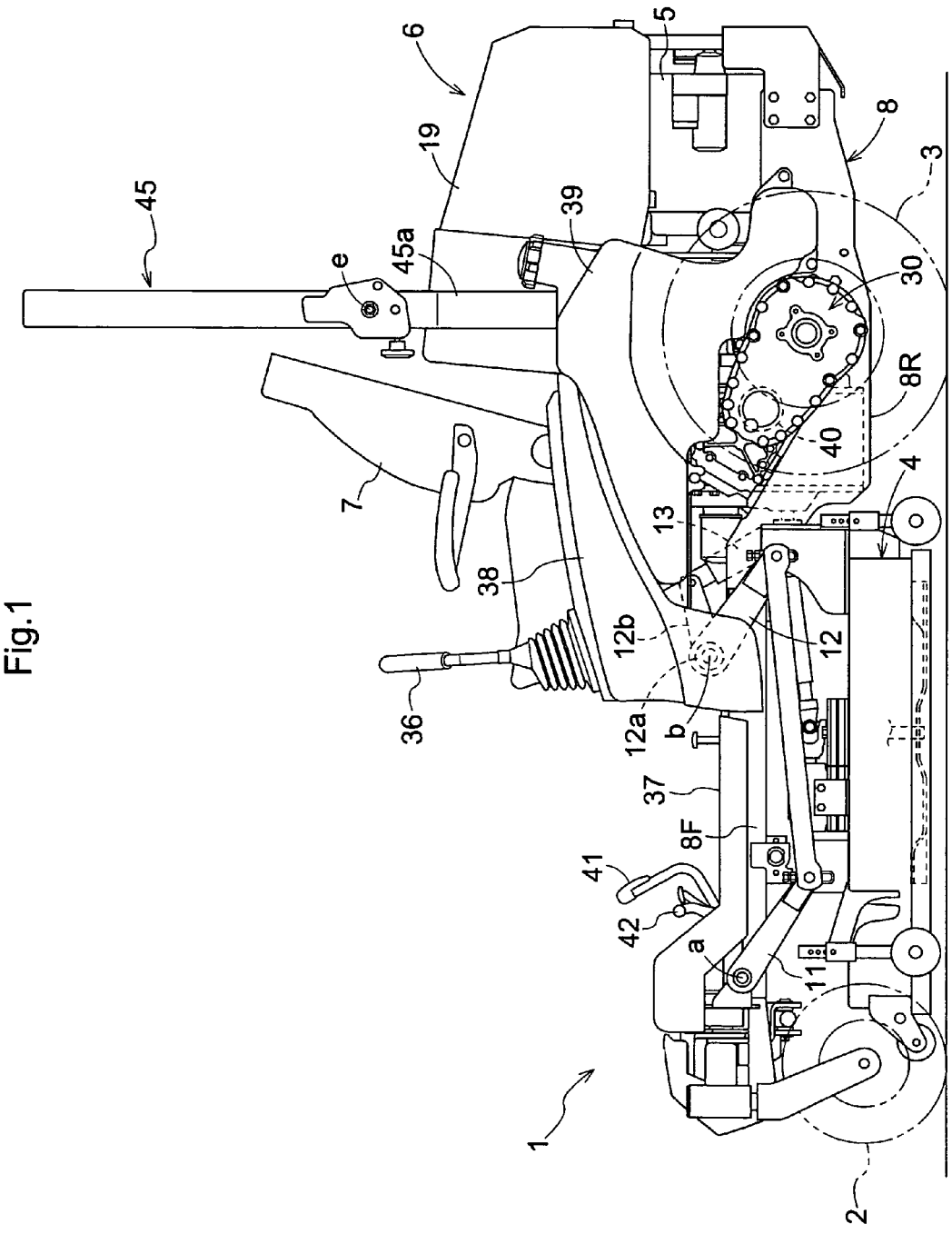
FIG. 1 is a side elevation of a riding type mower.
Figure 2:
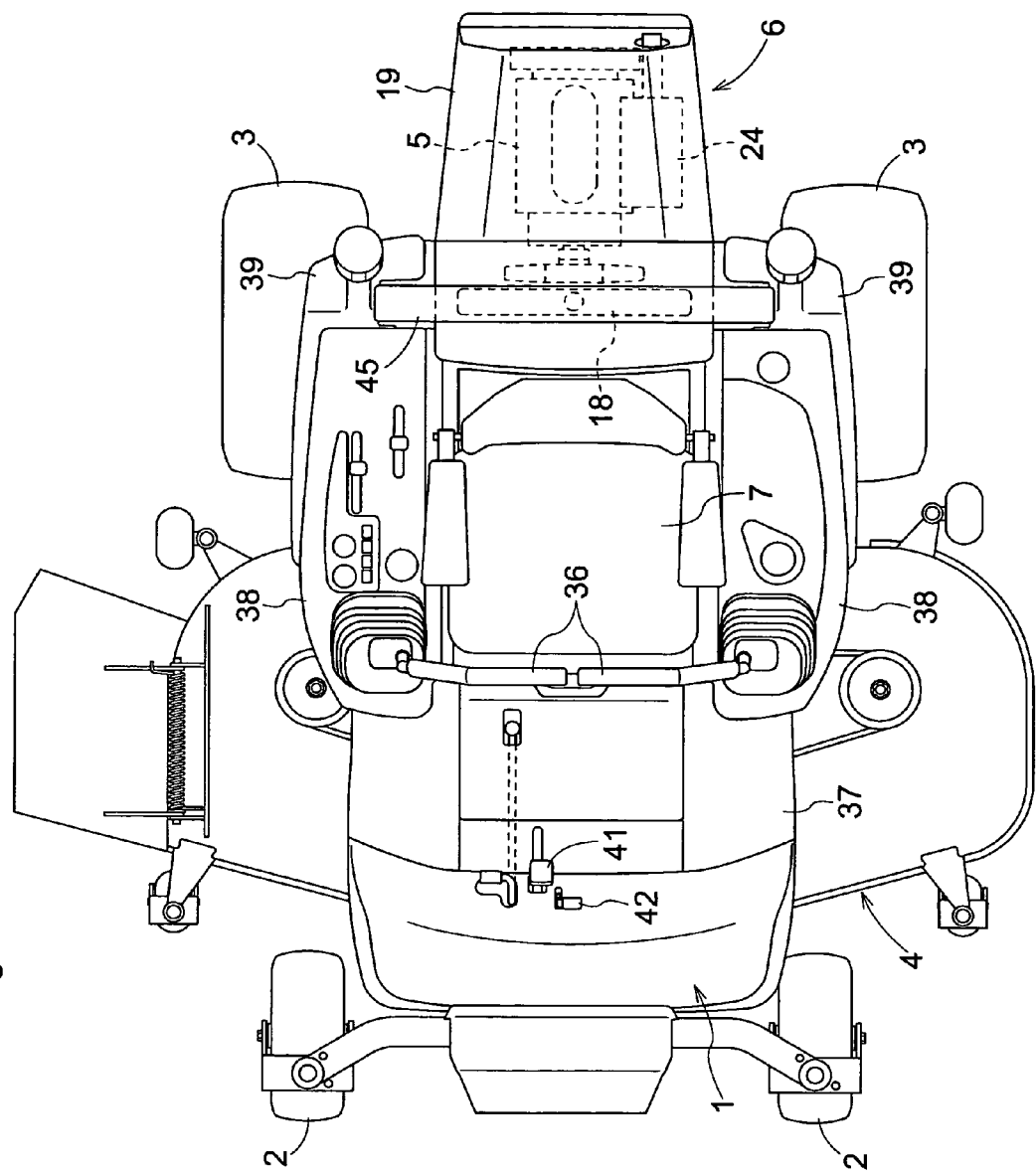
FIG. 2 is a plan view of the riding type mower.

FIG. 1 shows a side elevation of a riding type mower according to this invention. FIG. 2 shows a plan view of the grass mower. This riding type mower is what is called a mid-mount mower with a bar blade type mower unit 4 suspended from a vehicle body 1 between a pair of right and left front wheels 2 and a pair of right and left rear wheels 3. The vehicle body 1 has a motor section 6 mounted on a rear portion thereof and housing an engine 5, and a driver's seat 7 disposed in an intermediate position in the fore and aft direction of the vehicle body 1.

The right and left front wheels 2 are in the form of caster type idle wheels. The right and left rear wheels 3 are drive wheels subjected to stepless speed changing and reversibly driven independently of each other. The mower can travel straight forward or backward by driving the right and left rear wheels 3 at equal speed forward or backward, and can turn to a selected direction by driving the right and left rear wheels 3 at different speeds.

Figure 6:
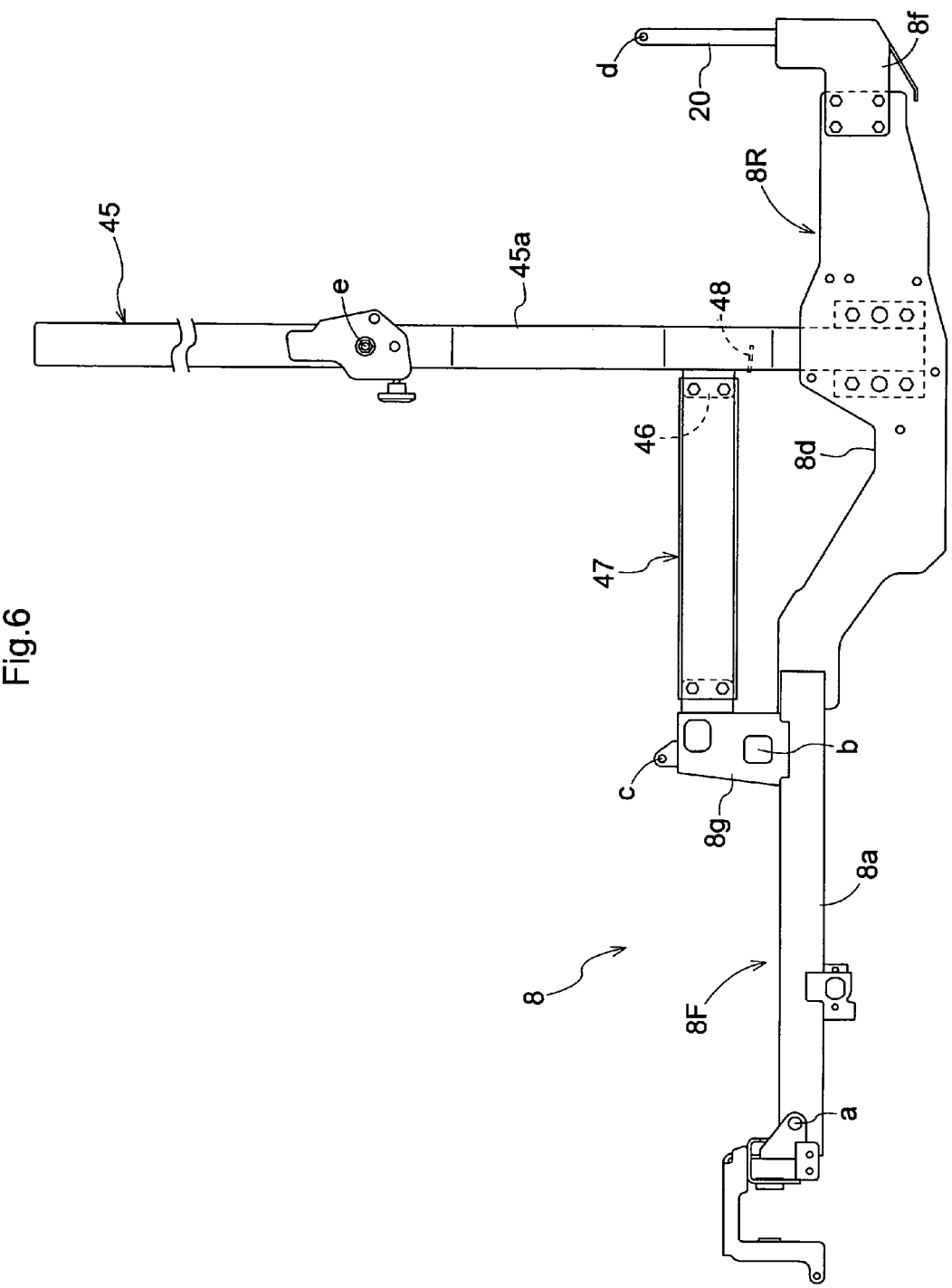
FIG. 6 is a side view showing a body frame and a rollover protection frame.
Figure 7:
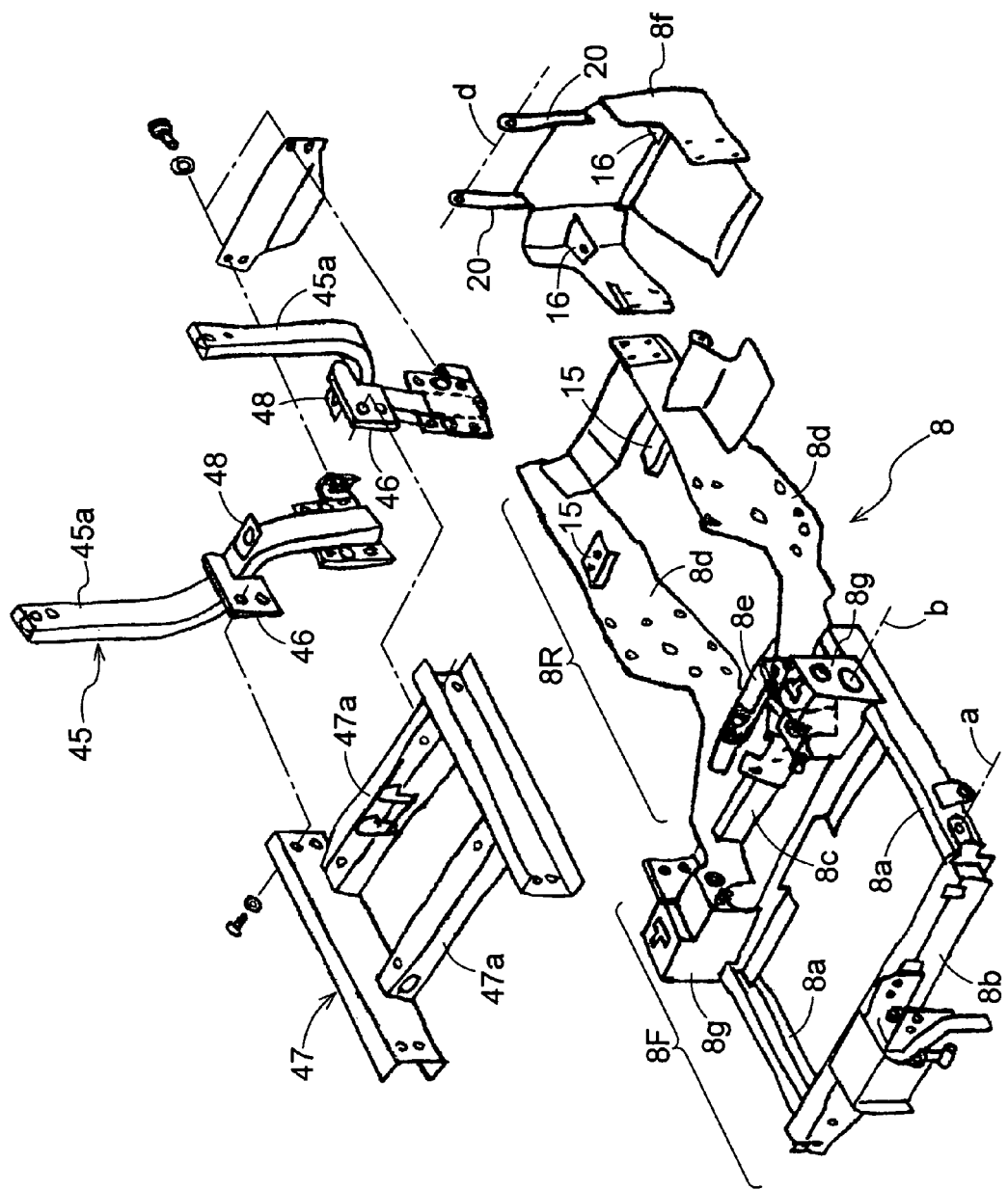
FIG. 7 is an exploded perspective view showing the body frame and rollover protection frame.

As shown in FIGS. 6 and 7, a body frame 8 of the vehicle body 1 includes a forward frame unit 8F of large transverse dimensions and a rearward frame unit 8R of small transverse dimensions. The forward frame unit 8F includes a pair of right and left frame strips 8a opposed to each other with a large transverse space in between, a front cross frame 8b extending and connected between front ends of the right and left frame strips 8a, and a rear cross frame 8c extending and connected between rear ends of the right and left frame strips 8a. The rearward frame unit 8R includes a pair of right and left vertical frame plates 8d connected to the rear cross frame 8c and opposed to each other with a smaller transverse space in between than in the forward frame unit 8F, and a cross support shaft 8e connecting intermediate positions in the fore and aft direction of the right and left frame plates 8d, and a cross frame plate 8f connecting rear ends of the right and left frame plates 8d.

Front links 11 and rear links 12 are connected to front and rear positions of the forward frame unit 8F to be vertically pivotable about axes a and b, respectively. The mower unit 4 is connected to free ends of these front links 11 and rear links 12 to be supported and suspended in a parallelogram linkage mode. A control arm 12b is rigidly connected to, and extends from, a pivot shaft 12a interconnecting the rear links 12. A single-acting hydraulic cylinder 13 extends between the control arm 12b and the cross support shaft 8e of the rearward frame unit 8R. The hydraulic cylinder 13 is extended by pressure oil supply to rock the rear links 12 upward to raise the mower unit 4 in parallel. The hydraulic cylinder 13 is contracted by oil drain therefrom, whereby the mower unit 4 lowers in parallel by gravity.

Vertical frames 8g project upward from adjacent the rear ends of the forward frame unit 8F, and define the pivotal axis b of the rear links 12. An upper cover 14 is pivotally connected to the vertical frames 8g to be vertically pivotable about an axis c. The driver's seat 7 is supported by the upper cover 14 to be positionally adjustable forward and backward.

Mounting brackets 15 and 16 project from right and left inner surfaces in rearward positions of the frame plates 8d and from right and left inner surfaces of the cross frame plate 8f of the rearward frame unit 8R, respectively. The engine 5 is mounted on these front and rear, right and left mounting brackets 15 and 16 in a vibration isolating manner.

The engine 5 used here is a water-cooled diesel engine with a radiator 18 disposed in front thereof, and an output shaft extending in the fore and aft direction. The engine 5 and radiator 18 are covered by a hood 19 attached, to be pivotable open and close about an axis d, to upper ends of stays 20 erected from the cross frame plate 8f. A cooling fan 21 rotatable by engine power is disposed behind the radiator 18 for drawing ambient air through an air inlet of dustproof structure formed in a front end of the hood 19 and supplying the air to the radiator 18.

Figure 8:
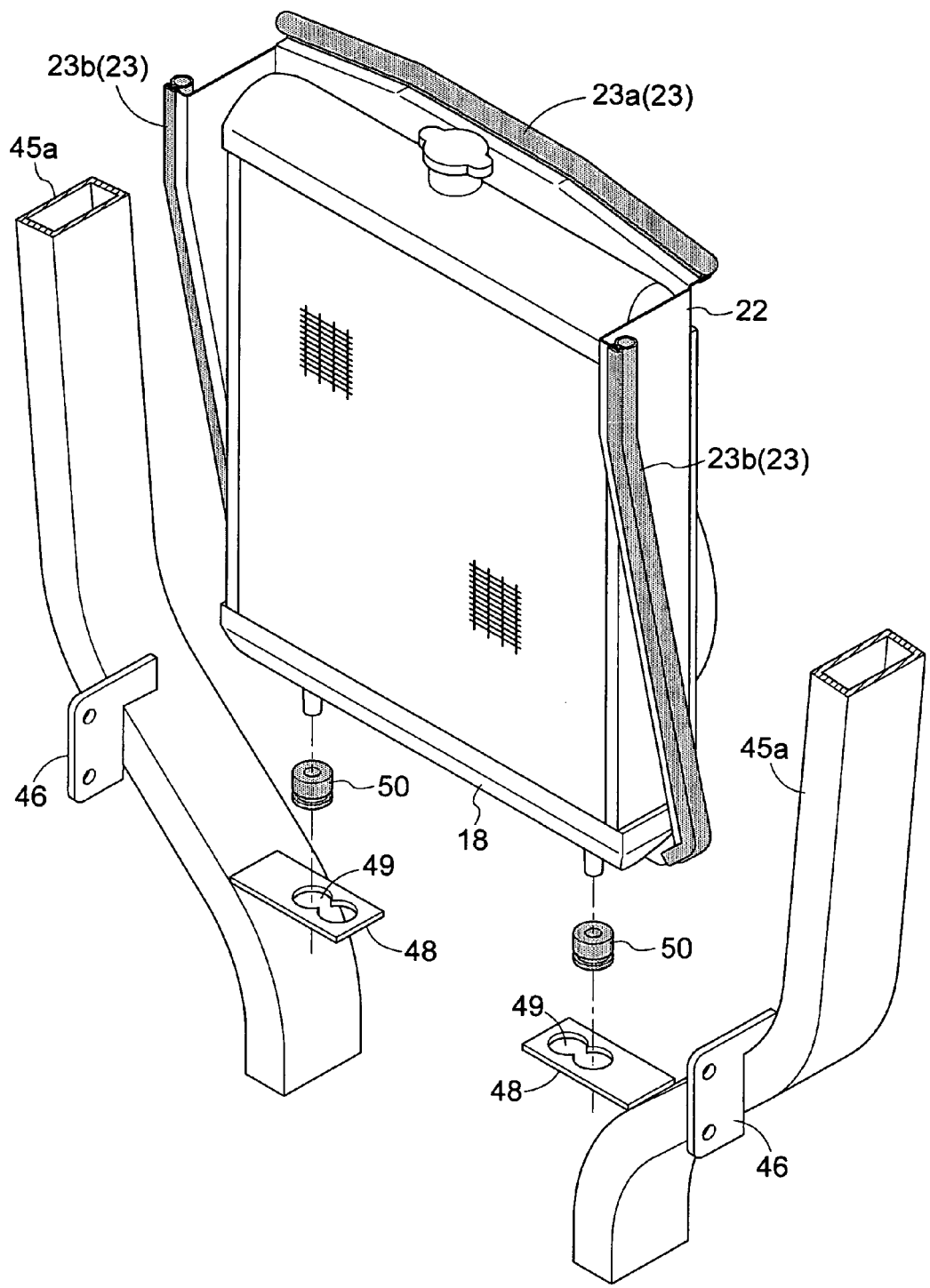
FIG. 8 is a perspective view showing a radiator support structure.
Figure 9:
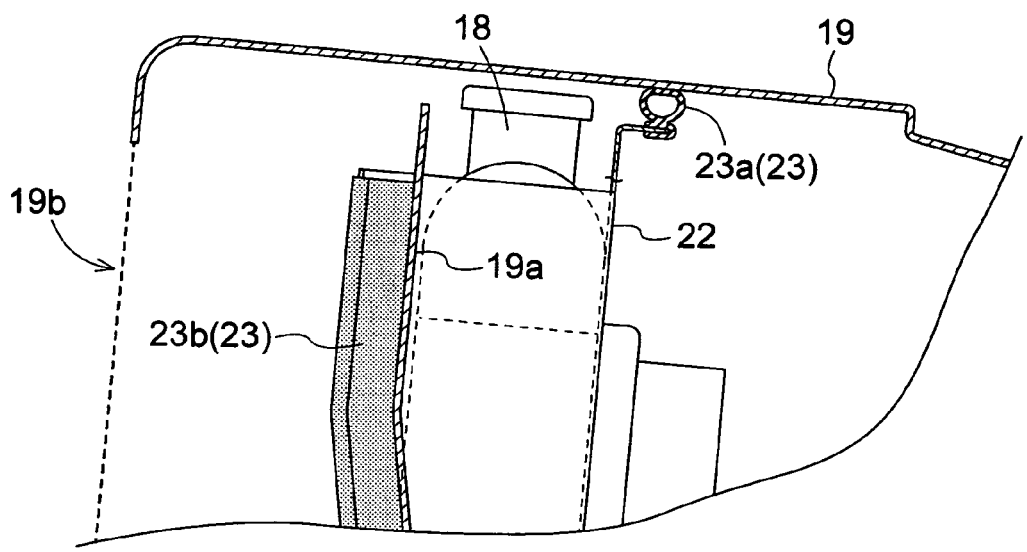
FIG. 9A and 9B are side views showing a seal structure around the radiator.
Figure 9:
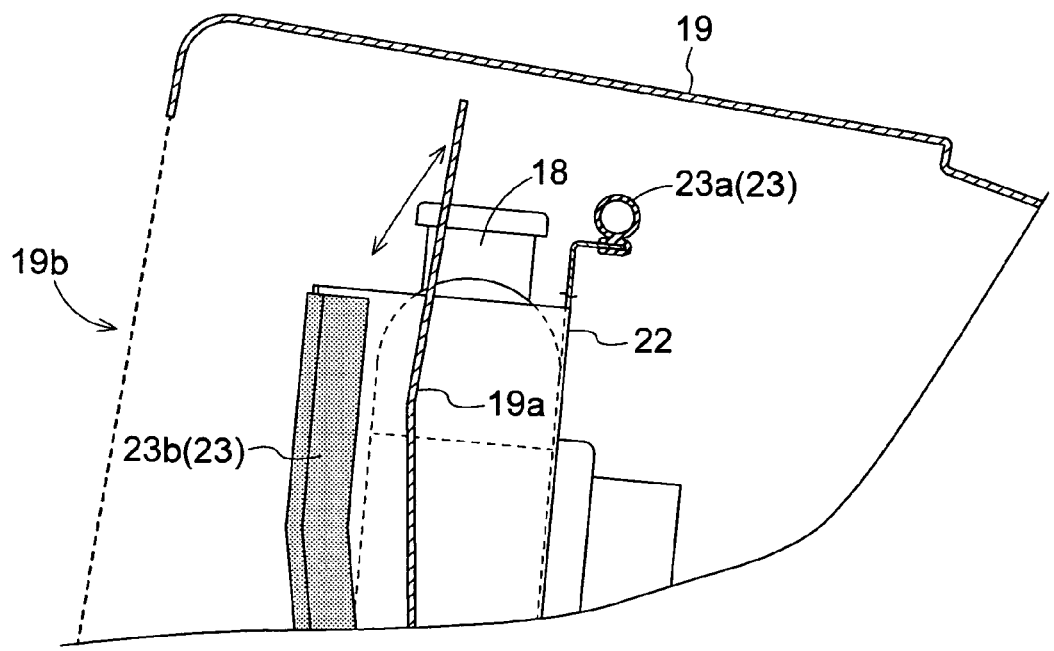
Figure 10:
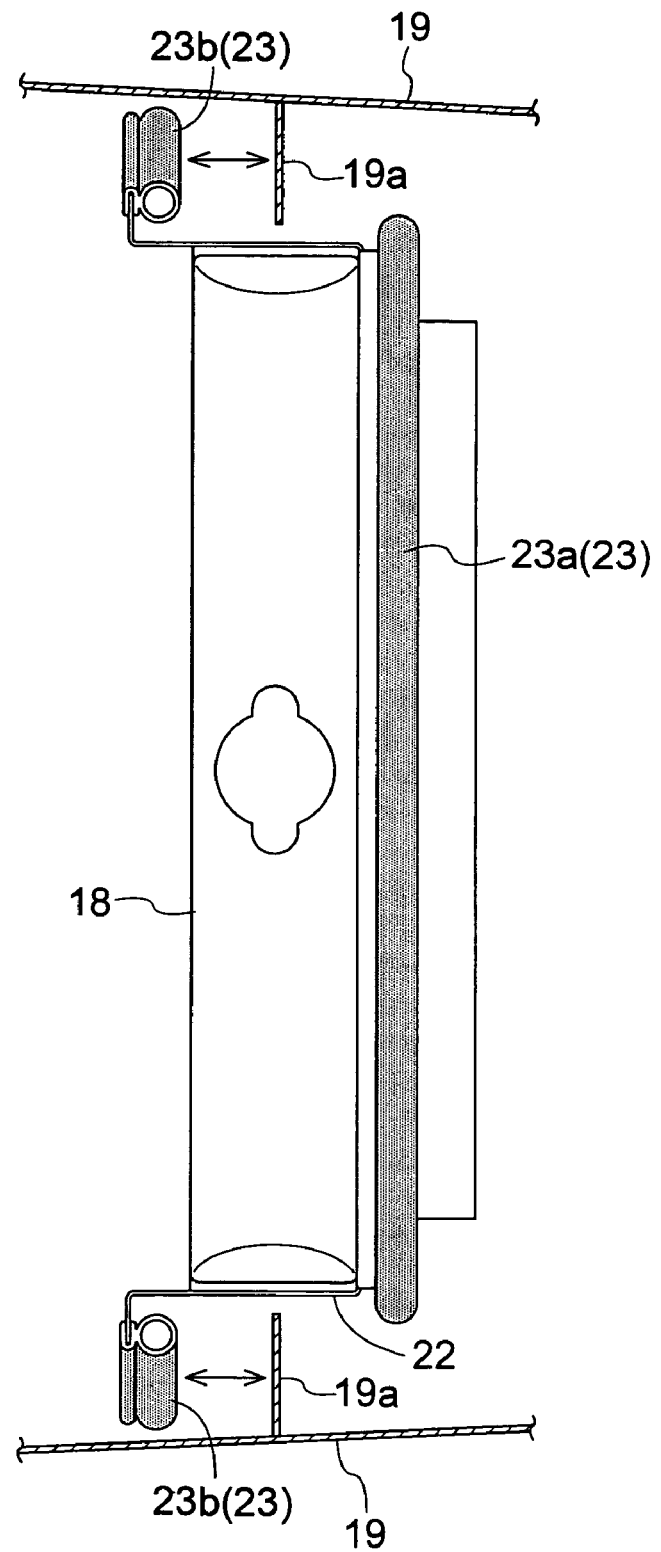
FIG. 10 is a plan view showing the seal structure around the radiator.

As shown in FIGS. 8-10, a partition plate 22 is disposed around the radiator 18 for preventing the heat in the engine room from diffusing forward around the radiator. The radiator 18 has a hollow sealer (trim) 23 attached peripherally thereof for elastically adhering to the hood 19. The sealer 23 includes an upper seal 23a extending along the outside of an upper edge of the partition plate 22, and side seals 23b extending along the backs of right and left edges of the partition plate 22. When the hood 19 is in a closed state, the upper seal 23a is in direct pressure contact with an inner surface of a top plate portion of the hood 19, while the side seals 23b are pressed at the rear thereof by presser pieces 19a projecting from right and left inner surfaces of the hood 19. This construction prevents the sealer 23 from detaching from the partition plate 22 by being rubbed by the right and left inner surfaces of the hood 19 being closed from an open state.

Figure 12:
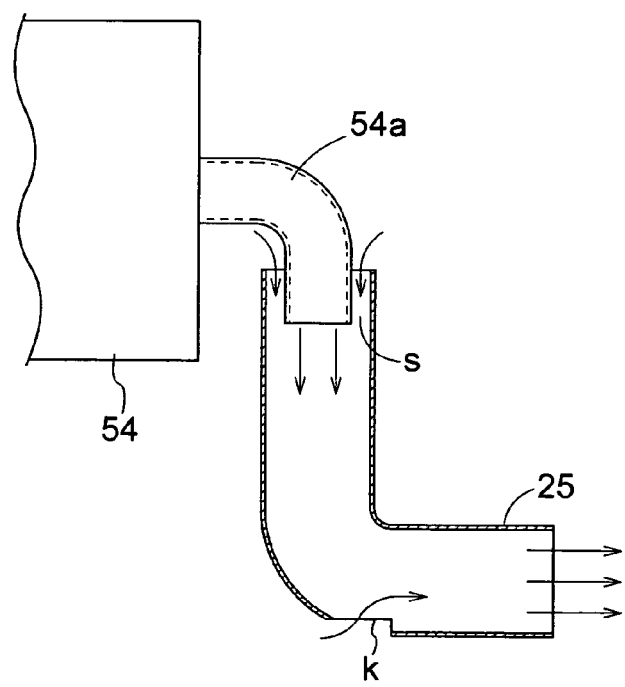
FIG. 12 is a sectional view showing an exhaust structure of a muffler.

As shown in FIG. 12, a bent exhaust pipe 25 extends from a muffler 24 mounted in the engine room, and projects from the rear end of the hood 19 outside the vehicle body. The exhaust pipe 25 is fitted with a small gap "s" to a tube 24a projecting from the muffler 24. Hot exhaust gas is diluted with ambient air drawn in through the small gap "s" by ejector action. The exhaust pipe 25 also has a cutout k downstream of a bend thereof. Exhaust gas is diluted with ambient air drawn in through the cutout k by ejector action accompanying the flow of the exhaust gas, to further lower the gas temperature.

Figure 3:
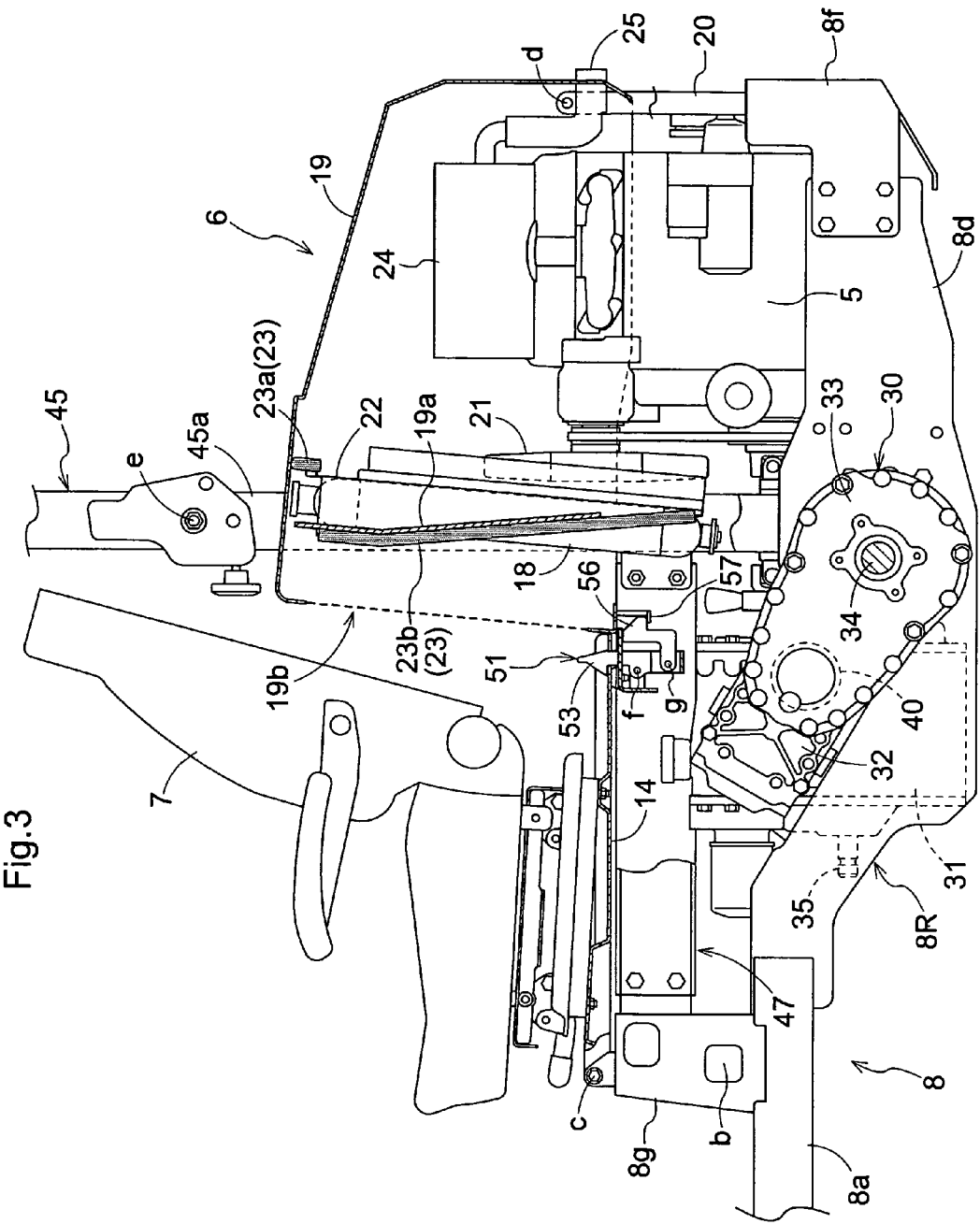
FIG. 3 is a side view of a rear portion of a vehicle body.
Figure 4:
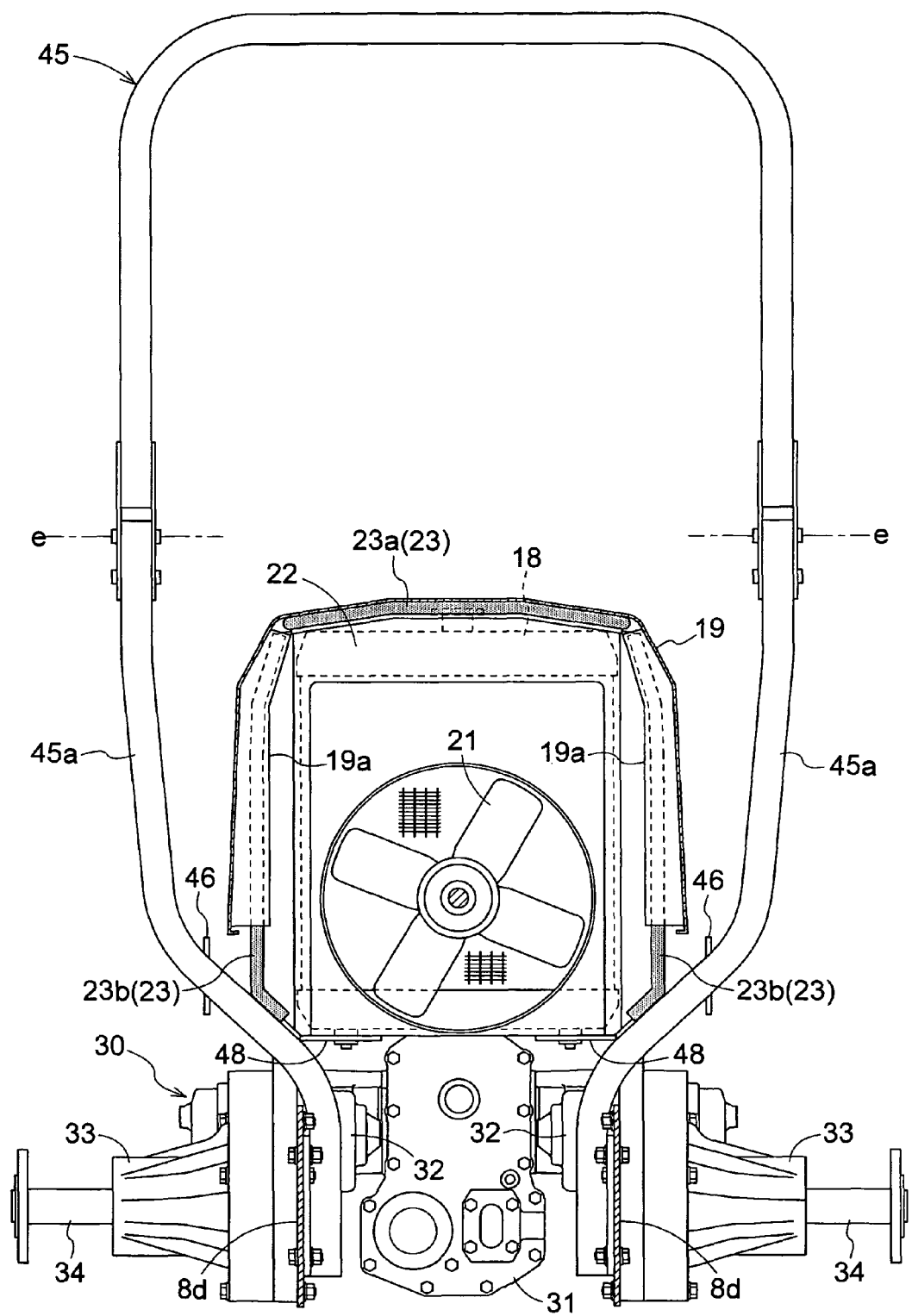
FIG. 4 is a rear view of the vehicle body.

A rear-wheel drive unit 30 is connected to, and supported by, intermediate positions in the fore and aft direction of the right and left frame plates 8d of the rearward frame unit 8R. As shown in FIGS. 3 and 4, the rear-wheel drive unit 30 includes a central transmission case 31 that receives output from the engine 5, a pair of hydrostatic stepless transmissions (HSTs) 32 connected to right and left sides of the transmission case 31, and a pair of right and left reduction cases 33 supporting the rear wheels 2. Engine power inputted to the central transmission case 31 from the back is branched right and left and transmitted to the hydrostatic stepless transmissions 32. Outputs at varied speeds from the hydrostatic stepless transmissions 32 are subjected to gear reduction in the reduction cases 33 and transmitted to axles 34 of the rear wheels 2. Further, a PTO shaft 35 projects from the front of the central transmission case 31. Working power taken from the PTO shaft 35 is transmitted through shafts to the mower unit 4.

The hydrostatic stepless transmissions 32 are the well-known axial plunger type each having a built-in fixed displacement motor (not shown) steplessly reversible by changing the swash plate angle of a built-in variable displacement pump (not shown) to vary discharge oil quantity and discharge direction. A swash plate angle control unit of each hydrostatic stepless transmission 32 is linked to one of shift levers 36 arranged at right and left sides of the driver's seat 7 to be rockable fore and aft. Each hydrostatic stepless transmission 32 is in a neutral, stop position when the shift lever 36 is held in a fore and aft neutral position, in a position to provide forward speeds when the shift lever 36 is operated forward from the neutral position, and in a position to provide backward speeds when the shift lever 36 is operated backward from the neutral position.

The forward frame unit 8F of the body frame 8 supports a footrest 37 located in a foot area of the driver's seat 7. Fenders 38 are arranged at the right and left sides of the driver's seat 7. A fuel tank 39 is disposed below each fender 38.

Each of the right and left reduction cases 33 has a brake 40 of the multi-plate type. Each brake 40 is linked to a brake pedal 41 disposed adjacent the center at the front of the footrest 27. The right and left brakes 40 are simultaneously operated by depressing the brake pedal 41. A brake lock pedal 42 for parking is disposed at a side of the brake pedal 41 for retaining the brake pedal 41 in a depressed position. Each of the right and left brakes 40 is operable independently of the other also by laterally outwardly rocking the right or left shift lever 36. This feature may be used when making a pivot turn by stopping one rear wheel 2 and driving only the other.

An arch-shaped rollover protection frame 45 is fixedly and substantially vertically erected rearwardly of the driver's seat 7. The rollover protection frame 45 is collapsible by folding it backward about an axis e at a vertically intermediate level. By folding up the rollover protection frame 45 in time of a mowing operation around trees, the mower can engage in the operation without the protection frame 45 getting caught by branches spreading out.

The rollover protection frame 45 has right and left support columns 45a bolt-connected at lower ends thereof to the right and left frame plates 8d of the rearward frame unit 8R. The support columns 45a of the rollover protection frame 45 as a whole converge downward, with portions above vertically intermediate positions curved laterally outward. Vertical connecting pieces 46 are attached to curved portions of the right and left support columns 45a. Vertical frames 8g project upward from the frame strips 8a of the forward frame unit 8F. Auxiliary frames 47 are provided to extend between the vertical frames 8g and the vertical connecting pieces 46 of the rollover protection frame 45.

The auxiliary frames 47 are interconnected in two, fore and aft positions thereof by cross frames 47a to form a highly rigid open framework. With the forward frame unit 8F of the body frame 8 and the rollover protection frame 45 interconnected by the auxiliary frames 47 in the form of a square framework, the entire body frame 8 has increased rigidity against vertical bending and twisting forces.

Sideways connecting pieces 48 (radiator support member) are attached to the curved portions of the right and left support columns 45a of the rollover protection frame 45. The sideways connecting pieces 48 define mounting bores 49 to which the bottom of the radiator 18 is connected for support through rubber cushions 50. The radiator 18 is erected as slightly tilted rearward. Seen laterally of the vehicle body, the radiator 18 is in an overlapping arrangement with the right and left support columns 45a of the rollover protection frame 45, the radiator 18 being fitted between the support columns 45a. The mounting bore 49 formed in each sideways connecting piece 48 is in the form of united right and left twin bores to be capable of connecting and supporting radiators 18 of different widths.

Figure 5:
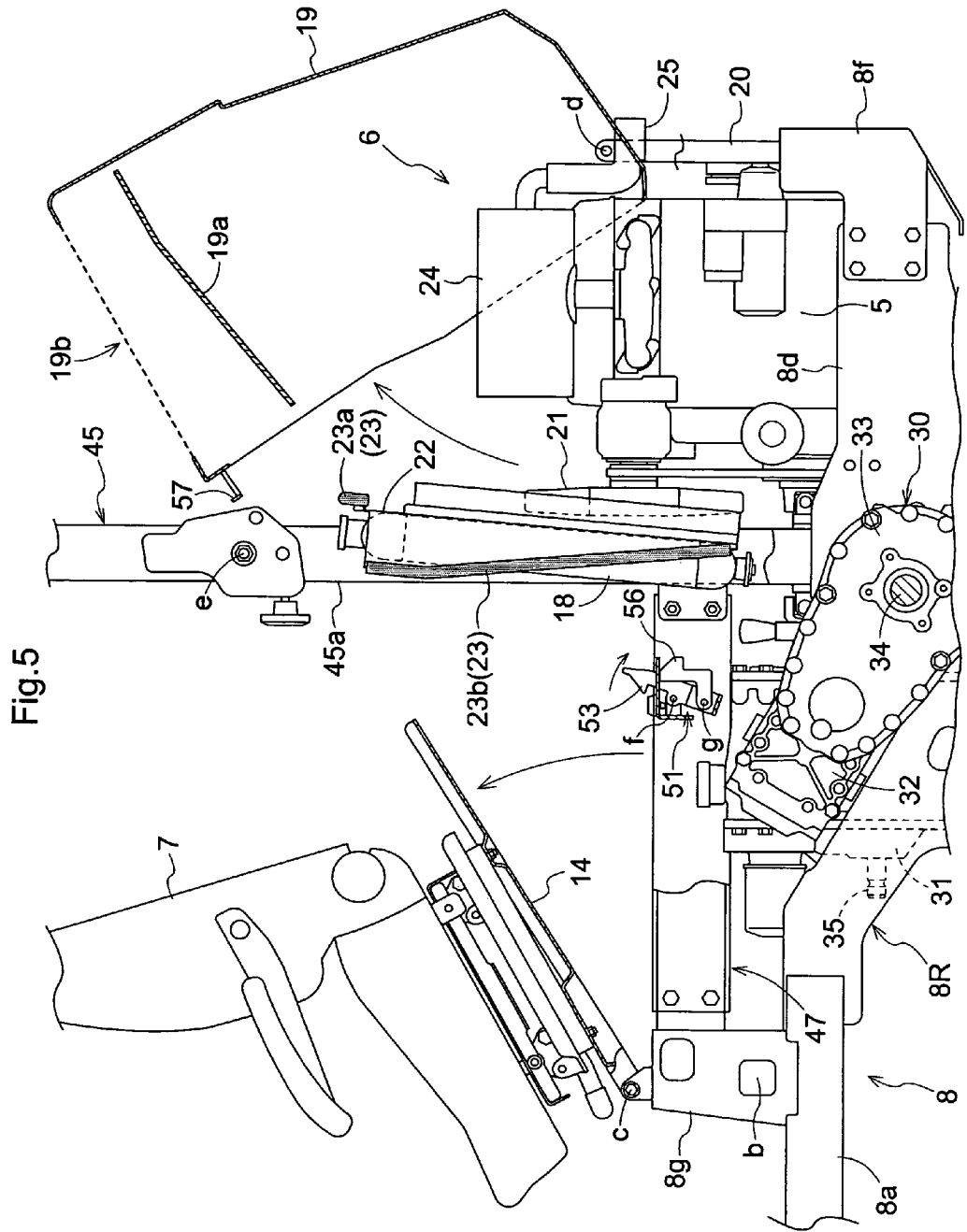
FIG. 5 is a side view of the rear portion of the vehicle body with a hood and an upper cover opened.
Figure 11:
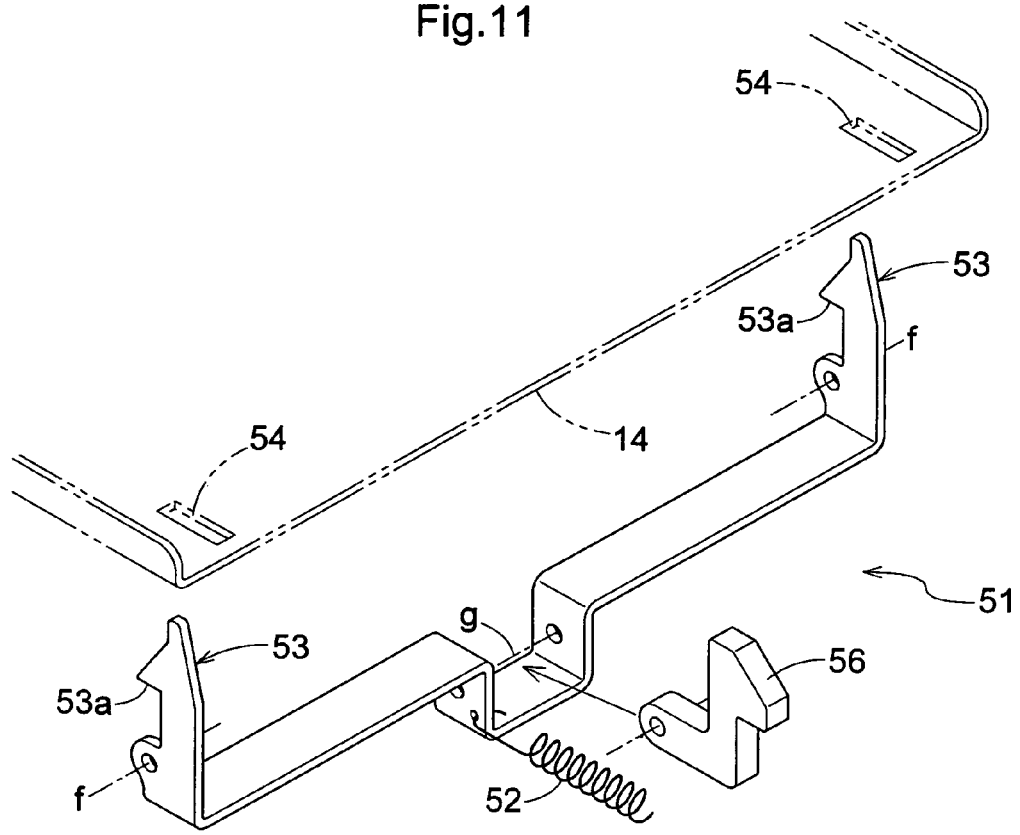
FIG. 11 is a perspective view showing a lock structure of the upper cover and hood.

The auxiliary frames 47 have a lock mechanism 51 for locking the upper cover 14 and hood 19 to a closed position. As shown in FIGS. 3, 5, and 11, the auxiliary frames 47 have a lock member 53 attached thereto to be pivotable fore and aft about an axis f and biased forward by a spring 52. The lock member 53 includes right and left hooks 53a for engaging right and left lock bores 54 formed in the upper cover 14, to lock the upper cover 14 to the closed position. The lock member 53 has a lock detent 56 connected thereto to be pivotable fore and aft about an axis g. The lock detent 56 is engageable from front with an engaging piece 57 disposed at a lower front end of the hood 19, to lock the hood 19 to the closed position.

The right and left hooks 53a of the lock member 53 project to a large extent from the lock bores 54 of the upper cover 14. By manually moving any one of the hooks 53a rearwardly, the hood 19 and upper cover 14 can be successively unlocked. When the hooks 53a in the locking position are moved rearwardly within a range not disengaging from the lock bores 54, the lock detent 56 moves forward with a pivotal movement of the lock member 53, to disengage from the engaging piece 57, thereby unlocking the hood 19. The upper cover 14 can be unlocked by further moving the hooks 53a to the extent of disengaging from the lock bores 54.

What is claimed is:

1. A riding type mower comprising:
   a plurality of wheels;
   a vehicle body comprising right and left vehicle frames supported by the plurality of wheels, the right and left vehicle frames comprising respective upward projecting vertical frames;
   a water-cooled engine located in a rear region of the vehicle body;
   a hood for covering the engine;
   a driver's seat located forwardly of the hood;
   a rollover protection frame located between the driver's seat and the water-cooled engine, the rollover protection frame having a pair of right and left support columns spaced apart from each other in a lateral direction;
   auxiliary frames connected between the vertical frames of the right and left vehicle frames and the respective right and left support columns such that the right and left vehicle frames and the rollover protection frame are interconnected by the auxiliary frames to form a rigid framework, and wherein respective ends of the rollover protection frame are connected to the right and left vehicle frames and the auxiliary frames are connected to the right and left support columns above the connection of the right and left support columns to the right and left vehicle frames so that auxiliary frames are elevated above to the right and left vehicle frames;
   a radiator for the water-cooled engine, the radiator located between the pair of the support columns of the rollover protection frame; and
   a pair of right and left radiator support members disposed adjacent to the connection of the auxiliary frames with the respective support columns and secured to the respective support columns to project laterally inward from the respective support columns, wherein a bottom of the radiator is fixedly secured to the pair of radiator support members.

2. A riding type mower according to claim 1 further comprising:
   cross frames connecting the auxiliary frames at a plurality of locations spaced apart in the longitudinal direction.

3. A riding type mower according to claim 1, wherein the rollover protection frame has first portions forming the respective ends thereof connected to the right and left vehicle frames, the support columns extend upward from the first portions, and the rollover protection frame has second portions that have greater space therebetween than the first portions and transition portions from the first portions to the second portions, and wherein each of the auxiliary frames is connected to the respective transition portions.

4. A riding type mower according to claim 1, wherein the driver's seat is pivotably supported about a lateral shaft such that the driver's seat can be pivoted away from the rollover protection frame, and the hood is pivotably supported about a further lateral shaft such that the hood can be pivoted away from the rollover protection frame.

5. A riding type mower according to claim 4 further comprising:
   lock means for maintaining the hood in its closed position and for maintaining the driver's seat in its operating position, wherein the lock means is constructed to release the driver's seat from the operating position after the hood is released from its closed position.

6. A riding type mower according to claim 1 wherein the hood extends to between the right and left support columns to cover the radiator.

7. A riding type mower according to claim 1 further comprising:
   a seal provided between the radiator and the hood.

8. A riding type mower according to claim 7 further comprising:
   a pressing piece attached to the hood and configured to press against a rearward facing surface of at least a part of the seal.

9. A riding type mower according to claim 8 wherein the pressing piece is shaped such that an upper portion of the pressing piece is located more forwardly than a lower portion of the pressing piece when the hood is in a closed position.

10. A riding type mower according to claim 1 wherein the hood is pivotable about a lateral shaft located at a level higher than a lower end of the radiator.

11. A riding type mower according to claim 1, wherein the right and left support columns each define a curved portion and the right and left radiator support members project laterally inward from the curved portions of the respective support columns.

* * * * *